US012691668B2

(12) United States Patent
Cheng et al.

(10) Patent No.: US 12,691,668 B2
(45) Date of Patent: Jul. 28, 2026

(54) POLYMER STRUCTURE AND APPLICATIONS THEREOF

(71) Applicant: CHITEC TECHNOLOGY CO., LTD., Taipei City (TW)

(72) Inventors: Ching-Hao Cheng, Taipei City (TW); Huang-Min Wu, Taipei City (TW); Wei-Chun Chang, Taipei City (TW); Yi-Shuo Huang, Taipei City (TW); Chi-Feng Wu, Taipei City (TW); De-Shun Luo, Taipei City (TW); Si-Yuan Chen, Taipei City (TW); Yen-Hei Chiang, Taipei City (TW)

(73) Assignee: Chitec Technology Co., Ltd., Taipei City (TW)

( * ) Notice: Subject to any disclaimer, the term of this patent is extended or adjusted under 35 U.S.C. 154(b) by 225 days.

(21) Appl. No.: 18/699,775

(22) PCT Filed: Nov. 15, 2022

(86) PCT No.: PCT/CN2022/131865
§ 371 (c)(1),
(2) Date: Apr. 9, 2024

(87) PCT Pub. No.: WO2024/103246
PCT Pub. Date: May 23, 2024

(65) Prior Publication Data
US 2025/0236100 A1 Jul. 24, 2025

(51) Int. Cl.
*B32B 27/40* (2006.01)
*B32B 27/08* (2006.01)
(Continued)

(52) U.S. Cl.
CPC .............. *B32B 27/40* (2013.01); *B32B 27/08* (2013.01); *B32B 27/18* (2013.01); *C08G 18/12* (2013.01);
(Continued)

(58) Field of Classification Search
CPC ......... B32B 27/40; B32B 27/08; B32B 27/18; B32B 2250/02; B32B 2250/24;
(Continued)

(56) References Cited

U.S. PATENT DOCUMENTS 7,910,642 B2 3/2011 Mäder et al.
10,717,714 B2 * 7/2020 Chiu .................. C08G 18/7692
(Continued)

FOREIGN PATENT DOCUMENTS

CN 114752311 A 7/2022
CN 114932729 A 8/2022
(Continued)

*Primary Examiner* — Blaine Copenheaver
(74) *Attorney, Agent, or Firm* — Christensen, Fonder, Dardi & Busse PLLC; John P. Fonder

(57) ABSTRACT

A polymer structure and applications thereof are provided. The polymer structure includes a substrate and a light shielding layer covering at least a portion of the surface of the substrate, wherein the substrate includes a first polymer, the light shielding layer comprises a second polymer which includes a structural unit derived from a first ultraviolet absorber, the light shielding layer has a thickness of 1 μm to 200 μm, and the first ultraviolet absorber is a polyfunctional reactive ultraviolet absorber.

16 Claims, 1 Drawing Sheet

(51) Int. Cl.

| | |
|---|---|
| ***B32B 27/18*** | (2006.01) |
| ***C08G 18/12*** | (2006.01) |
| ***C08G 18/32*** | (2006.01) |
| ***C08G 18/48*** | (2006.01) |
| ***C08K 5/3475*** | (2006.01) |

(52) U.S. Cl.
CPC ..... *C08G 18/3206* (2013.01); *C08G 18/4854* (2013.01); *C08K 5/3475* (2013.01); *B32B 2250/02* (2013.01); *B32B 2250/24* (2013.01); *B32B 2307/71* (2013.01); *B32B 2307/732* (2013.01); *B32B 2375/00* (2013.01)

(58) Field of Classification Search
CPC .......... B32B 2307/71; B32B 2307/732; B32B 2375/00; C08G 18/12; C08G 18/3206; C08G 18/4854; C08K 5/3475
See application file for complete search history.

(56) References Cited

U.S. PATENT DOCUMENTS

| | | | | |
|---|---|---|---|---|
| 2020/0199084 | A1* | 6/2020 | Chiu .................. | C08G 18/0823 |
| 2021/0283879 | A1 | 9/2021 | Ueno | |

FOREIGN PATENT DOCUMENTS

| | | | |
|---|---|---|---|
| TW | 201906979 | A | 2/2019 |
| TW | M637034 | U | 1/2023 |
| WO | WO 2019/167450 | A1 | 9/2019 |

* cited by examiner

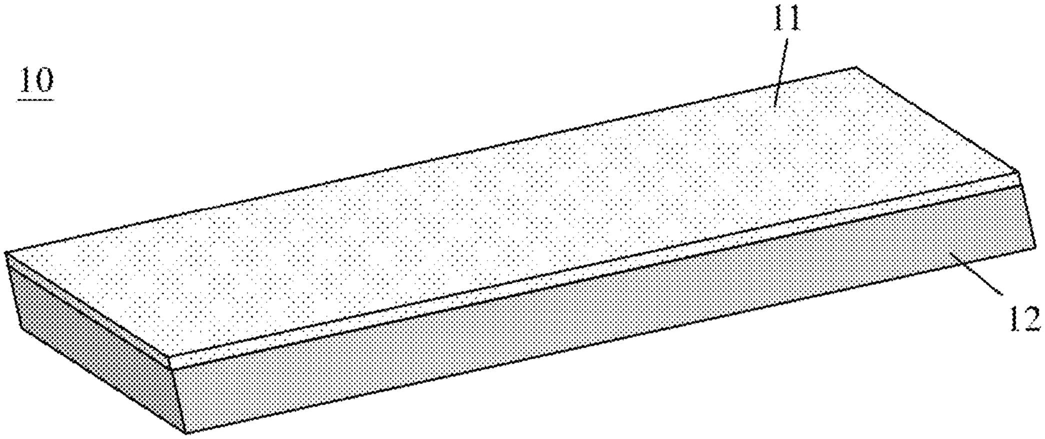
10
11
12

POLYMER STRUCTURE AND APPLICATIONS THEREOF

PRIORITY CLAIM

The present application is a National Phase entry of PCT Application No. PCT/CN2022/131865, filed Nov. 15, 2022, the disclosure of which are hereby incorporated by reference herein in its entirety.

FIELD OF THE INVENTION

The present invention relates to a polymer structure, specifically, a thermoplastic polyurethane structure with a thin ultraviolet-shielding layer.

BACKGROUND OF THE INVENTION

Polyurethane is a significant polymer formed by polymerizing a polyhydric alcohol and an isocyanate. By adjusting the proportions of the raw materials, a material with the desired mechanical properties can be produced. These desired mechanical properties include wear resistance, temperature tolerance, flexibility, extensibility, and the like. Polyurethanes finds extensive applications in various materials, such as coating materials, elastomers, foam materials, adhesives, sealing agents, and the like. Generally, polyurethanes can be broadly classified into aliphatic polyurethanes and aromatic polyurethanes depending on the presence of an aromatic ring in their structure. Aromatic polyurethanes exhibit superior physicochemical properties and workability compared to aliphatic polyurethanes. However, aromatic polyurethanes face challenges related to weatherability and yellowing, which are difficult to resolve industrially.

U.S. Pat. No. 7,910,642 B2 proposes that the aforementioned problems may be addressed by using an addition-type ultraviolet absorber (UVA) and a hindered amine light stabilizer (HALS). However, due to the limitations in compatibility between the addition-type ultraviolet absorber and the hindered amine light stabilizer, the addition amount of the addition-type ultraviolet absorber is constrained. Consequently, the anti-yellowing effect cannot be significantly improved. As a result, the challenges related to yellowing remain unresolved, imposing restrictions on the applications of aromatic polyurethanes, especially in outdoor products, over an extended period.

SUMMARY OF THE INVENTION

To prevent the properties of a polymer material from being affected by ultraviolet irradiation, conventional methods involve directly adding or reacting an ultraviolet absorber into the polymer material to be protected. In these methods, the ultraviolet absorption components are uniformly distributed throughout the entire polymer material. Consequently, even though only the ultraviolet absorption components near the surface of the polymer material contribute to the anti-ultraviolet function, a substantial amount of the ultraviolet absorber must be added to the entire polymer material to ensure that the content of the ultraviolet absorption components near the surface of the polymer material is sufficient to withstand ultraviolet. However, adding a large quantity of the ultraviolet absorber not only increase costs but also has adverse effects on the physicochemical properties of the polymer material. This is especially problematic for transparent or white polymer materials (such as thermoplastic polyurethane), which hold high application value. The addition of a significant amount of ultraviolet absorber can noticeably impact the color of the polymer material, diminishing its visual appeal and, consequently, reducing its commercial value. This a key reason why aromatic polyurethanes are often excluded from outdoor product applications, despite their superior physicochemical properties and workability compared to aliphatic polyurethanes.

In view of the above technical problems, the present invention provides an innovative approach involving the creation of a thin ultraviolet-shielding layer on the surface of the polymer material, resulting in a composite polymer material. The composite polymer material offers several advantages simultaneously: effective resistance to ultraviolet radiation, cost-effectiveness, and minimal impact on the physicochemical properties of the polymer material. The present invention resolves the long-standing industrial challenges associated with utilizing aromatic polyurethanes in outdoor products.

Specifically, an objective of the present invention is to provide a polymer structure, which comprises a substrate and a light shielding layer covering at least a portion of a surface of the substrate, wherein the substrate comprises a first polymer, the light shielding layer comprises a second polymer, the second polymer comprises a structural unit derived from a first ultraviolet absorber, the light shielding layer has a thickness of 1 μm to 200 μm, and the first ultraviolet absorber is a polyfunctional reactive ultraviolet absorber.

In some embodiments of the present invention, the light shielding layer has a thickness of 2 μm to 100 μm.

In some embodiments of the present invention, the first ultraviolet absorber is represented by the following chemical formula (I):

[Chemical formula (I)]

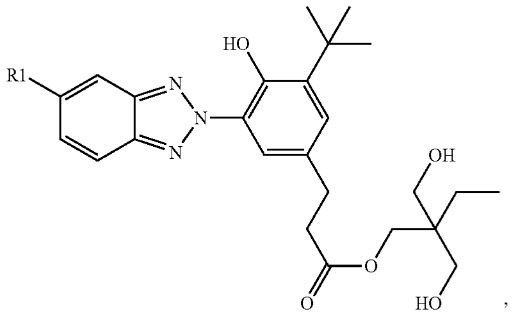

in chemical formula (I), R1 is H or Cl.

In some embodiments of the present invention, based on the total weight of the second polymer, the content of the first ultraviolet absorber ranges from 0.5 wt % to 45 wt %.

In some embodiments of the present invention, the first polymer and the second polymer are independently selected from the group consisting of a polyurethane, a polyester, a polycarbonate, an epoxy resin, an amino resin, a polyamide, a polyimide, polypropylene, polyethylene, a liquid crystal polymer, an acrylonitrile-butadiene-styrene copolymer, polyoxymethylene, polystyrene, and composites thereof.

In some embodiments of the present invention, the first polymer and the second polymer are independently a polyurethane.

In some embodiments of the present invention, the first polymer and the second polymer are independently a thermoplastic polyurethane.

In some embodiments of the present invention, the first polymer is an aromatic polyurethane.

In some embodiments of the present invention, the light shielding layer at least covers a light-receiving surface of the substrate.

In some embodiments of the present invention, the polymer structure has a visible light transmittance of 65% or more.

In some embodiments of the present invention, the substrate and the light shielding layer independently comprise an additive selected from the group consisting of a defoaming agent, a leveling wetting agent, a thickener, a dispersing agent, micronized wax, a matting powder, an antibacterial agent, a metal oxide-based light screening agent, a light stabilizer, a thermal stabilizer, a non-reactive ultraviolet absorber, a monofunctional reactive ultraviolet absorber, a polyfunctional reactive ultraviolet absorber rather than the first ultraviolet absorber, an antioxidant, a filler, a flame retardant, a plasticizer, a dye, a pigment, a brightener, an antistatic agent, a fluorescent whitening agent, an antideteriorant, a metal stabilizer, an acid absorbent, an anti-hydrolysis agent, wax, and combinations thereof.

Another objective of the present invention is to provide use of the polymer structure of the aforementioned polymer structure for preparation of an ultraviolet-resistant article.

In some embodiments of the present invention, the article is selected from the group consisting of a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, and an explosion-proof panel.

In some embodiments of the present invention, the article is selected from the group consisting of a wrap film for vehicles, a lamp cup, a housing for mobile devices, a housing for vehicles, a car lamp, a vehicle interior trim material, a windscreen, a side-window glass, a window, a door, a color filter, clothes, pants, a coat, shoes, an optical lens, an optical element, a photochromic lens, a contact lens, a roof film, a roof tile, a roof lining, eaves, a wall material, a floor material, a road construction member, a conduit material, a signboard, a sun visor, a greenhouse covering film, a backlight, a windmill component, a transparent aircraft component, a radome, an explosion-proof glass, a bullet-proof panel, a transparent screen film, a conductive film, a microwave absorbing film, a thermal transfer film, a packaging film, and a low-resistance film.

To render the above objectives, technical features and advantages of the present invention more apparent, the present invention will be described in detail with reference to some embodiments hereinafter.

BRIEF DESCRIPTION OF THE DRAWINGS

FIG. 1 is a schematic view showing the structure of an embodiment of the polymer structure of the present invention.

BRIEF DESCRIPTION OF REFERENCE NUMERALS

10: polymer structure
11: light shielding layer
12: substrate

DESCRIPTION OF THE EMBODIMENTS

Hereinafter, some embodiments of the present invention will be described in detail. However, the present invention may be embodied in various embodiments and should not be limited to the embodiments described in the specification.

Unless otherwise specified, the expressions "a," "the," or the like recited in the specification and in the claims should include both the singular and the plural forms.

Unless otherwise specified, the expressions "first," "second," or the like recited in the specification and the claims are only used to distinguish the illustrated elements or components without special meanings. Those expressions are not used to represent any priority.

Unless otherwise specified, as used in the specification and the claims, the term "non-reactive ultraviolet absorber" refers to an ultraviolet-absorbing compound containing no reactive functional group(s). Unless otherwise specified, as used in the specification and the claims, "monofunctional reactive ultraviolet absorber" refers to an ultraviolet-absorbing compound containing one reactive functional group, while "polyfunctional reactive ultraviolet absorber" refers to an ultraviolet-absorbing compound with two or more reactive functional groups. Examples of the reactive functional group include, but are not limited to, hydroxy, carboxyl, carbonyl, amino, cyano, sulfonyl, phenyl, and nitro.

Unless otherwise specified, as used in the specification and the claims, the expression "light-receiving surface" refers to a surface irradiated by light.

The present invention provides a polymer structure with a thin ultraviolet light shielding layer, especially a polymer structure comprising a thermoplastic aromatic polyurethane as a substrate. The ultraviolet light shielding layer serves to prevent yellowing of the polymer substrate, such as thermoplastic aromatic polyurethane. Additionally, the thickness of the ultraviolet light shielding layer is controlled within a specified range to minimize the adverse impact on the appearance and light transmittance of the thermoplastic aromatic polyurethane structure. Further details regarding the polymer structure of the present invention and its applications are elaborated below.

1. Polymer Structure

FIG. 1 is a schematic view showing the structure of the polymer structure of an embodiment of the present invention. As shown in FIG. 1, the polymer structure 10 of the present invention comprises a substrate 12 and a light shielding layer 11 covering at least a portion of a surface of the substrate. In some embodiments of the present invention, the light shielding layer 11 at least covers a light-receiving surface of the substrate 12, providing an ultraviolet light shielding effect. In the preferred embodiments of the present invention, the light shielding layer 11 completely covers either the light-receiving surface of the substrate 12 or both the light-receiving and non-light-receiving surfaces of the substrate 12.

1.1. Substrate

In the polymer structure of the present invention, the substrate comprises a first polymer, consists essentially of a first polymer, or consists of a first polymer. In some embodiments of the present invention, the substrate is formed from a first polymer and optional additive(s).

The type of the first polymer is not particularly limited. Examples of the first polymer include, but are not limited to, a polyurethane, a polyester, a polycarbonate, an epoxy resin, an amino resin, a polyamide, a polyimide, polypropylene, polyethylene, a liquid crystal polymer, an acrylonitrile-butadiene-styrene copolymer, polyoxymethylene, polystyrene, and composites thereof. Examples of the polyurethane include, but are not limited to, an acrylic-modified polyurethane and a thermoplastic polyurethane, and the thermoplastic polyurethane may be a thermoplastic aromatic polyurethane or a thermoplastic aliphatic polyurethane. A specific example of the polyimide is a colorless polyimide (CPI). Examples of the polyester include, but are not limited to, polyethylene terephthalate (PET), polybutylene terephthalate (PBT), polypropylene terephthalate (PTT), thermoplastic polyester elastomer (TPEE), and polyarylate (PAR). In some embodiments of the present invention, the first polymer is a polyurethane, specifically a thermoplastic polyurethane, and more specifically a thermoplastic aromatic polyurethane.

Optional additives can adaptively improve the processability of the substrate or impart specific functions to the substrate. Examples of the additives include but are not limited to a defoaming agent, a leveling wetting agent, a thickener, a dispersing agent, micronized wax, a matting powder, an antibacterial agent, a metal oxide-based light screening agent, a light stabilizer, a thermal stabilizer, a non-reactive ultraviolet absorber, a monofunctional reactive ultraviolet absorber, a polyfunctional reactive ultraviolet absorber different from the first ultraviolet absorber, an antioxidant, a filler, a flame retardant, a plasticizer, a dye, a pigment, a brightener, an antistatic agent, a fluorescent whitening agent, an antideteriorant, a metal stabilizer, an acid absorbent, an anti-hydrolysis agent, and wax. The aforementioned additives can be used alone or in a mixture of two or more. A specific example of the light stabilizer is a hindered amine light stabilizer (HALS), which is an amino-containing compound capable of capturing free radicals to inhibit photodegradation and is typically a derivative of tetramethylpiperidine.

The content of the additive(s) is not particularly limited; it should be sufficient to achieve the desired functions. In some embodiments of the present invention, the substrate comprises a thermoplastic aromatic polyurethane as the first polymer and a hindered amine light stabilizer (HALS). The content of HALS, based on 100 parts by weight of the first polymer, can range from 0.01 parts by weight to 5 parts by weight. For example, based on 100 parts by weight of the first polymer, the content of HALS can be 0.01 parts by weight, 0.02 parts by weight, 0.03 parts by weight, 0.04 parts by weight, 0.05 parts by weight, 0.06 parts by weight, 0.07 parts by weight, 0.08 parts by weight, 0.09 parts by weight, 0.1 parts by weight, 0.2 parts by weight, 0.3 parts by weight, 0.4 parts by weight, 0.5 parts by weight, 0.6 parts by weight, 0.7 parts by weight, 0.8 parts by weight, 0.9 parts by weight, 1 parts by weight, 1.1 parts by weight, 1.2 parts by weight, 1.3 parts by weight, 1.4 parts by weight, 1.5 parts by weight, 1.6 parts by weight, 1.7 parts by weight, 1.8 parts by weight, 1.9 parts by weight, 2 parts by weight, 2.1 parts by weight, 2.2 parts by weight, 2.3 parts by weight, 2.4 parts by weight, 2.5 parts by weight, 2.6 parts by weight, 2.7 parts by weight, 2.8 parts by weight, 2.9 parts by weight, 3 parts by weight, 3.1 parts by weight, 3.2 parts by weight, 3.3 parts by weight, 3.4 parts by weight, 3.5 parts by weight, 3.6 parts by weight, 3.7 parts by weight, 3.8 parts by weight, 3.9 parts by weight, 4 parts by weight, 4.1 parts by weight, 4.2 parts by weight, 4.3 parts by weight, 4.4 parts by weight, 4.5 parts by weight, 4.6 parts by weight, 4.7 parts by weight, 4.8 parts by weight, 4.9 parts by weight, or 5 parts by weight, or within a range between any two of the values described herein.

In the polymer structure of the present invention, the thickness of the substrate is not particularly limited. For example, the thickness of the substrate can range from 1 μm to 150 mm. For example, the thickness of the substrate can be 1 μm, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, or 150 mm, or within a range between any two of the values described herein, but the present invention is not limited thereto.

Since the thin light shielding layer is incorporated into the polymer structure of the present invention, there is no need to add a large amount of ultraviolet-absorbing components to the substrate, preserving the original physicochemical properties of the substrate more effectively, especially its original color or transparency. Thus, in some embodiments of the present invention, the entire polymer structure can have a visible light transmittance of 65% or more. For example, the visible light transmittance of the polymer structure can be 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99%, or 100%. In some embodiments of the present invention, the polymer structure can have a visible light transmittance of 95% or more.

1.2. Light Shielding Layer

In the polymer structure of the present invention, the light shielding layer comprises a second polymer, consists essentially of a second polymer, or consists of a second polymer. The second polymer comprises a structural unit derived from a first ultraviolet absorber. In some embodiments of the present invention, the light shielding layer is formed from a second polymer and optional additive(s).

In the polymer structure of the present invention, the thickness of the light shielding layer can range from 1 μm to 200 μm. For example, the thickness of the light shielding layer can be 1 μm, 2 μm, 3 μm, 4 μm, 5 μm, 6 μm, 7 μm, 8 μm, 9 μm, 10 μm, 11 μm, 12 μm, 13 μm, 14 μm, 15 μm, 16 μm, 17 μm, 18 μm, 19 μm, 20 μm, 21 μm, 22 μm, 23 μm, 24 μm, 25 μm, 26 μm, 27 μm, 28 μm, 29 μm, 30 μm, 31 μm, 32 μm, 33 μm, 34 μm, 35 μm, 36 μm, 37 μm, 38 μm, 39 μm, 40 μm, 41 μm, 42 μm, 43 μm, 44 μm, 45 μm, 46 μm, 47 μm, 48 μm, 49 μm, 50 μm, 51 μm, 52 μm, 53 μm, 54 μm, 55 μm, 56 μm, 57 μm, 58 μm, 59 μm, 60 μm, 61 μm, 62 μm, 63 μm, 64 μm, 65 μm, 66 μm, 67 μm, 68 μm, 69 μm, 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm, 90 μm, 91 μm, 92 μm, 93 μm, 94 μm, 95 μm, 96 μm, 97 μm, 98 μm, 99 μm, 100 μm, 101 μm, 102 μm, 103 μm, 104 μm, 105 μm, 106 μm, 107 μm, 108 μm, 109 μm, 110 μm, 111 μm, 112 μm, 113 μm, 114 μm, 115 μm, 116 μm, 117 μm, 118 μm, 119 μm, 120 μm, 121 μm, 122 μm, 123 μm, 124 μm, 125 μm, 126 μm, 127 μm, 128 μm, 129 μm, 130 μm, 131 μm, 132 μm, 133 μm, 134 μm, 135 μm, 136 μm, 137 μm, 138 μm, 139 μm, 140 μm, 141 μm, 142 μm, 143 μm, 144 μm, 145 μm, 146 μm, 147 μm, 148 μm, 149 μm, 150 μm, 151 μm, 152 μm, 153 μm, 154 μm, 155 μm, 156 μm, 157 μm, 158 μm, 159 μm, 160 μm, 161 μm, 162 μm, 163 μm, 164 μm, 165 μm, 166

μm, 167 μm, 168 μm, 169 μm, 170 μm, 171 μm, 172 μm, 173 μm, 174 μm, 175 μm, 176 μm, 177 μm, 178 μm, 179 μm, 180 μm, 181 μm, 182 μm, 183 μm, 184 μm, 185 μm, 186 μm, 187 μm, 188 μm, 189 μm, 190 μm, 191 μm, 192 μm, 193 μm, 194 μm, 195 μm, 196 μm, 197 μm, 198 μm, 199 μm, or 200 μm, or within a range between any two of the values described herein. In the preferred embodiments of the present invention, the thickness of the light shielding layer ranges from 2 μm to 100 μm. When the thickness of the light shielding layer falls within the aforementioned range, the issue of reduced transparency due to a high concentration of ultraviolet absorber can be avoided, thus preserving the visible light transmittance of the entire polymer structure.

The type of the second polymer is not particularly limited. Examples of the second polymer include, but are not limited to, a polyurethane, a polyester, a polycarbonate, an epoxy resin, an amino resin, a polyamide, a polyimide, polypropylene, polyethylene, a liquid crystal polymer, an acrylonitrile-butadiene-styrene copolymer, polyoxymethylene, polystyrene, and composites thereof. Examples of the polyurethane include, but are not limited to, an acrylic-modified polyurethane and a thermoplastic polyurethane. The thermoplastic polyurethane may be a thermoplastic aromatic polyurethane or a thermoplastic aliphatic polyurethane. A specific example of the polyimide is CPI. Examples of the polyester include, but are not limited to, PET, PBT, PTT, TPEE, and PAR. In some embodiments of the present invention, the second polymer is a polyurethane, specifically a thermoplastic polyurethane, and more specifically a thermoplastic aromatic polyurethane.

The first ultraviolet absorber is a polyfunctional reactive ultraviolet absorber, encompassing any ultraviolet absorber that have multiple reactive functional groups that can be bonded to the polymer chain of the second polymer. In the preferred embodiments of the present invention, the first ultraviolet absorber is a benzotriazole-based ultraviolet absorber, more preferably an ultraviolet absorber represented by the following chemical formula (I).

[Chemical formula (I)]

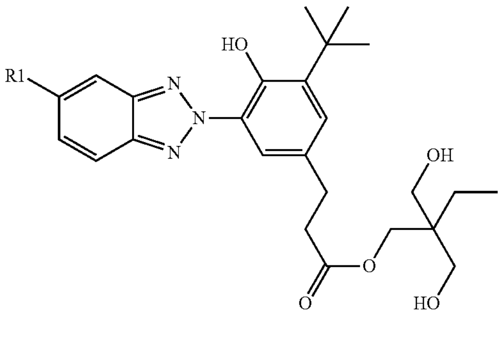

In chemical formula (I), R1 is H or Cl. The compound represented by chemical formula (I) can be synthesized by reacting a compound with a benzotriazole structure with a compound containing three hydroxy groups in the presence of an acid catalyst. Examples of compounds with a benzotriazole structure include, but are not limited to, 3-(2H-benzotriazol-2-yl)-5-(1,1-dimethylethyl)-4-hydroxy-benzenepropanoic acid or 3-(5-chloro-2H-benzotriazol-2-yl)-5-(1,1-dimethylethyl)-4-hydroxy-benzenepropanoic acid. Examples of compounds containing three hydroxy groups include, but are not limited to, trimethylolpropane. Examples of acid catalysts include, but are not limited to, para-toluene-sulfonic acid.

The method of forming the light shielding layer of the polymer structure of the present invention is not particularly limited. The light shielding layer can be formed using existing plastic shaping methods or thin-film coating methods. For example, when the light shielding layer is prepared using polyurethane as the second polymer, a first ultraviolet absorber (e.g., a compound of chemical formula (I)) can be added into the raw materials for synthesizing polyurethane, participating in the polymerization reaction and resulting in polyurethane with a structural unit derived from the first ultraviolet absorber. Based on the total weight of the second polymer, the content of the first ultraviolet absorber can range from 0.5 wt % to 45 wt %. For example, based on the total weight of the second polymer, the content of the first ultraviolet absorber can be 0.5 wt %, 0.6 wt %, 0.7 wt %, 0.8 wt %, 0.9 wt %, 1 wt %, 1.5 wt %, 2 wt %, 2.5 wt %, 3 wt %, 3.5 wt %, 4 wt %, 4.5 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, 30 wt %, 31 wt %, 32 wt %, 33 wt %, 34 wt %, 35 wt %, 36 wt %, 37 wt %, 38 wt %, 39 wt %, 40 wt %, 41 wt %, 42 wt %, 43 wt %, 44 wt %, or 45 wt %, or within a range between any two of the values described herein. The polyurethane with a structural unit derived from the first ultraviolet absorber can form the light shielding layer through co-extrusion or co-injection together with the first polymer, which serves as the substrate. Alternatively, the polyurethane with a structural unit derived from the first ultraviolet absorber can form the light shielding layer by dissolving in an organic solvent to form a solution. This solution can then be coated onto the surface of the substrate. A detailed description of the preparation of the light shielding layer is provided in the following examples and is therefore omitted here.

1.3. Other Layer Structure

In addition to the substrate and the light shielding layer covering at least a portion of a surface of the substrate, the polymer structure of the present invention may further comprise another layer structure. In some embodiments of the present invention, a carrier layer can be placed on the surface of the substrate not covered by the light shielding layer. The carrier layer can be a polymer film, sheet, or plate formed from a third polymer. Examples of the third polymer are similar to those described for the first and second polymers and are omitted here.

In the case where the polymer structure of the present invention comprises a carrier layer, the thickness of the carrier layer is not particularly limited, but typically falls within the range of 100 μm to 200 mm. For example, the thickness of the carrier layer can be 100 μm, 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm, 950 μm, 1 mm, 5 mm, 10 mm, 15 mm, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, 105 mm, 110 mm, 115 mm, 120 mm, 125 mm, 130 mm, 135 mm, 140 mm, 145 mm, 150 mm, 155 mm, 160 mm, 165 mm, 170 mm, 175 mm, 180 mm, 185 mm, 190 mm, 195 mm, or 200 mm, or within a range between any two of the values described herein.

2. Applications

The polymer structure of the present invention finds wide applications in various fields, including but are not limited to the building industry, aircraft industry, transportation vehicle industry, electronics industry, medical devices, daily necessities, food industry, and military industry. With excellent weatherability and anti-yellowing property, the polymer structure of the present invention is particularly suitable for prolonged exposure to sunlight or ultraviolet light. Furthermore, its good visible light transmittance (i.e., transparency) allows it to cover objects without compromising their appearance, making it suitable for use as a transparent housing.

Thus, the present invention also provides a use of the polymer structure for preparation of an ultraviolet-resistant article. In some embodiments of the present invention, the article can be a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, or an explosion-proof panel, but the present invention is not limited thereto.

Examples of the transportation vehicle member include, but are not limited to, a lamp, a housing for vehicles, a car lamp, a vehicle interior trim material, a windscreen, and a side-window glass. Examples of the transparent housing include, but are not limited to, a lamp cup and a backlight. Examples of the electronic product member include, but are not limited to, a housing for mobile devices. Examples of the clothing material include, but are not limited to, clothes, pants, a coat, and shoes. Examples of the optical article include, but are not limited to, an optical lens, an optical element, a photochromic lens, and a contact lens. Examples of the architectural member include, but are not limited to, a window, a door, a roof film, a roof tile, a roof lining, eaves, a wall material, a floor material, a road construction member, a conduit material, a signboard, and a sun visor. Examples of the wind power member include, but are not limited to, a windmill component. Examples of the agricultural member include, but are not limited to, a greenhouse covering film. Examples of the military-industrial article include, but are not limited to, a transparent aircraft component, a radome, and a bullet-proof panel. Examples of the external viewing surface of display include, but are not limited to, a transparent screen film. Examples of the film include, but are not limited to, a wrap film for vehicles, a conductive film, a microwave absorbing film, a thermal transfer film, a packaging film, and a low-resistance film. Examples of the thin sheet include, but are not limited to, a color filter. Examples of the explosion-proof panel include, but are not limited to, an explosion-proof glass.

3. EXAMPLES 3.1. Testing Methods

The present invention is further illustrated by the embodiments hereinafter, wherein the testing instruments and methods are as follows.

[Weatherability Test-Xenon Lamp]

The sample is placed in a xenon lamp aging test machine (model: Q-SUN Xenon Test Chamber, available from Q-Lab) and subjected to a weatherability test under the following conditions: a blackboard temperature of 60° C., and an irradiance of 0.5 W/$m^2$ @ 340 nm.

[Weatherability Test-Outdoor Sunlight]

The sample is placed outdoors in a location with ample sunlight and subjected to a weatherability test.

[Color Hue Test]

The yellow index (YI) of the sample is tested in accordance with ASTM 1926-70 using a spectrocolorimeter (model: ColorQuest XE, available from Hunter Lab).

[Chromatic Aberration Test]

The ΔE of the sample is tested using a UV-Vis spectrophotometer (model: Varian Cary® 50, available from Agilent).

3.2. Thermoplastic Aromatic Polyurethane for Light-Shielding Layer 3.2.1. Preparation of Thermoplastic Aromatic Polyurethane

Preparation Example 1-1

100 g of polytetrahydrofuran (model: PTMEG1000, available from Mitsubishi Chemical, OH value is 112.2), 11 g of 1,4-butanediol (available from Tokyo Chemical Industry), 0.15 wt % (based on the total weight of reactants) of a hindered phenol-based antioxidant (model: Deox 105, available from Chitec Technology), 0.05 wt % (based on the total weight of reactants) of a benzo-furanone-based antioxidant (model: Revonox 501, available from Chitec Technology), 0.1 wt % (based on the total weight of reactants) of an organophosphite-based antioxidant (model: Deox 604, available from Chitec Technology), 0.5 wt % (based on the total weight of reactants) of an ultraviolet stabilizer (model: Chiguard 1152, available from Chitec Technology), 0.85 g of a reactive ultraviolet absorber (model: Chiguard R-455, available from Chitec Technology), and 200 ppm of dibutyltin dilaurate were added into a reaction iron pot. The mixture was heated to 110° C. 56 g of methylene diphenyl diisocyanate (MDI) (available from BASF) was heated to 110° C. and then added into the reaction pot, where it was stirred for 1 (one) minute to react, resulting in thermoplastic aromatic polyurethane. Based on the total weight of the thermoplastic aromatic polyurethane, the content of the reactive ultraviolet absorber is about 0.5 wt %.

Preparation Example 1-2

The preparation method of Preparation Example 1-1 was repeated to prepare the thermoplastic aromatic polyurethane of Preparation Example 1-2, except that the amount of MDI was adjusted to 56.5 g, and the amount of the reactive ultraviolet absorber Chiguard R-455 was adjusted to 1.7 g. Based on the total weight of the thermoplastic aromatic polyurethane, the content of the reactive ultraviolet absorber is about 1.0 wt %.

Preparation Example 1-3

The preparation method of Preparation Example 1-1 was repeated to prepare the thermoplastic aromatic polyurethane of Preparation Example 1-3, except that the amount of MDI was adjusted to 57 g, and the amount of the reactive ultraviolet absorber Chiguard R-455 was adjusted to 2.55 g. Based on the total weight of the thermoplastic aromatic polyurethane, the content of the reactive ultraviolet absorber is about 1.5 wt %.

Preparation Example 1-4

The preparation method of Preparation Example 1-1 was repeated to prepare the thermoplastic aromatic polyurethane of Preparation Example 1-4, except that the amount of MDI was adjusted to 57.4 g, and the amount of the reactive ultraviolet absorber Chiguard R-455 was adjusted to 3.45 g.

Based on the total weight of the thermoplastic aromatic polyurethane, the content of the reactive ultraviolet absorber is about 2.0 wt %.

Reference Example 1

The preparation method of Preparation Example 1-1 was repeated to prepare the thermoplastic aromatic polyurethane of Reference Example 1, except that the reactive ultraviolet absorber Chiguard R-455 was omitted, and 0.85 g of an oxamide-based addition-type ultraviolet absorber (model: Tinuvin® 312, available from BASF) was added. Based on the total weight of the thermoplastic aromatic polyurethane, the content of the addition-type ultraviolet absorber is about 0.5 wt %.

Reference Example 2

The preparation method of Reference Example 1 was repeated to prepare the thermoplastic aromatic polyurethane of Reference Example 2, except that the amount of the addition-type ultraviolet absorber 312 was adjusted to 1.7 g. Based on the total weight of the thermoplastic aromatic polyurethane, the content of the addition-type ultraviolet absorber is about 1.0 wt %.

Reference Example 3

The preparation method of Reference Example 1 was repeated to prepare the thermoplastic aromatic polyurethane of Reference Example 3, except that the amount of the addition-type ultraviolet absorber 312 was adjusted to 2.55 g. Based on the total weight of the thermoplastic aromatic polyurethane, the content of the addition-type ultraviolet absorber is about 1.5 wt %.

Preparation Example 1-5

The preparation method of Preparation Example 1-1 was repeated to prepare the thermoplastic aromatic polyurethane of Preparation Example 1-5, except that the amount of MDI was adjusted to 60.3 g, and the amount of the reactive ultraviolet absorber Chiguard R-455 was adjusted to 9 g. Based on the total weight of the thermoplastic aromatic polyurethane, the content of the reactive ultraviolet absorber is about 5 wt %.

Preparation Example 1-6

The preparation method of Preparation Example 1-1 was repeated to prepare the thermoplastic aromatic polyurethane of Preparation Example 1-6, except that the amount of MDI was adjusted to 66.3 g, and the amount of the reactive ultraviolet absorber Chiguard R-455 was adjusted to 19.7 g. Based on the total weight of the thermoplastic aromatic polyurethane, the content of the reactive ultraviolet absorber is about 10 wt %.

Preparation Example 1-7

The preparation method of Preparation Example 1-1 was repeated to prepare the thermoplastic aromatic polyurethane of Preparation Example 1-7, except that the amount of MDI was adjusted to 82 g, and the amount of the reactive ultraviolet absorber Chiguard R-455 was adjusted to 48.5 g. Based on the total weight of the thermoplastic aromatic polyurethane, the content of the reactive ultraviolet absorber is about 20 wt %.

3.2.2. Preparation of Specimen of Thermoplastic Aromatic Polyurethane

The thermoplastic aromatic polyurethanes of Preparation Examples 1-1 to 1-4 and Reference Examples 1 to 3 were used to prepare specimens. 55 g of the thermoplastic aromatic polyurethane was dried at 100° C. for 2 hours to eliminate surface moisture. Subsequently, the thermoplastic aromatic polyurethane was placed in a mold (with a dimension of 20 cm×15 cm×0.15 cm), and then hot-pressed using a hot press machine (available from Long Chang Mechanical Industrial) at 190° C. and a pressure of 20 kg/$cm^2$ for 1.5 minutes. Finally, the hot-pressed thermoplastic aromatic polyurethane was cooled in a cold press machine under a pressure of 50 kg/$cm^2$ for 5 to 10 minutes, resulting in a specimen of thermoplastic aromatic polyurethane with a thickness of 0.15 cm.

3.2.3. Outdoor Sunlight Weatherability Test of Specimen of Thermoplastic Aromatic Polyurethane The thermoplastic aromatic polyurethane specimens were subjected to outdoor sunlight weatherability test according to the aforementioned testing method, and the results are tabulated in Table 1.

TABLE 1

Outdoor sunlight weatherability test of specimen of thermoplastic aromatic polyurethane

| | | UVA | Added amount of UVA (wt %) | 0 hour YI | ΔYI after 172 days of outdoor sunlight |
|---|---|---|---|---|---|
| Preparation Example | 1-1 | R-455 | 0.5 | 3.9 | 9.3 |
| | 1-2 | R-455 | 1.0 | 4.7 | 7.7 |
| | 1-3 | R-455 | 1.5 | 5.9 | 6.9 |
| | 1-4 | R-455 | 2.0 | 4.5 | 5.8 |
| Reference Example | 1 | 312 | 0.5 | 2.7 | 9.7 |
| | 2 | 312 | 1.0 | 4.8 | Blooming observed on the 96th day |
| | 3 | 312 | 1.5 | 4.9 | Blooming observed on the 11th day |

As can be seen from Table 1, the outdoor light and yellowing resistance of the thermoplastic aromatic polyurethane improves with an increase in the added amount of the ultraviolet absorber. As shown in Preparation Examples 1-1 to 1-4, when the structure of the thermoplastic aromatic polyurethane includes a structural unit derived from the compound of chemical formula (I), the ΔYI value is lower, and it decreases along with the increase in the added amount. Particularly, as shown in Preparation Examples 1-2 to 1-4, since the reactive ultraviolet absorber participates in the chain extension reaction during the synthesis of thermoplastic polyurethane and becomes part of the main chain of the polymer, there is no blooming problem even with a high added amount of the reactive ultraviolet absorber. The reactive ultraviolet absorber imparts excellent weatherability to the thermoplastic polyurethane, making it suitable for long-term outdoor use with superior weatherability and yellowing resistance. In contrast, as shown in Reference Examples 2 and 3, the addition-type ultraviolet absorber causes blooming problems under a large added amount, making it unsuitable for long-term outdoor use.

3.3. Preparation of Substrate of Polymer Structure

Preparation Example 2-1

100 g of polytetrahydrofuran PTMEG1000, 11 g of 1,4-butanediol, 0.15 wt % (based on the total weight of reactants) of a hindered phenol-based antioxidant Deox 105, 0.05 wt % (based on the total weight of reactants) of a benzo-furanone-based antioxidant Revonox 501, 0.1 wt % (based on the total weight of reactants) of an organophosphite-based antioxidant Deox 604, 0.5 wt % (based on the total weight of reactants) of an ultraviolet stabilizer Chiguard 1152, and 200 ppm of dibutyltin dilaurate were added into a reaction iron pot. The mixture was heated to 110° C. 55.5 g of MDI was heated to 110° C. and then added into the reaction pot, where it was stirred for 1 (one) minute to react, resulting in a rubber block of thermoplastic aromatic polyurethane. The rubber block was baked in an oven at 70° C. for 24 hours and then processed into a substrate with a thickness of 0.15 cm according to the preparing method described in section 3.2.2.

Preparation Example 2-2

100 g of polyethyleneglycol butyleneglycol adipate (model: PEBA1000, available from Chanda Chemical, OH value is 112.2), 11 g of 1,4-butanediol, 0.15 wt % (based on the total weight of reactants) of a hindered phenol-based antioxidant Deox 105, 0.05 wt % (based on the total weight of reactants) of a benzo-furanone-based antioxidant Revonox 501, 0.1 wt % (based on the total weight of reactants) of an organophosphite-based antioxidant Deox 604, and 200 ppm of dibutyltin dilaurate were added into a reaction iron pot. The mixture was heated to 110° C. 55.5 g of MDI was heated to 110° C. and added into the reaction pot, where it was stirred for 1 (one) minute to react, resulting in a rubber block of thermoplastic aromatic polyurethane. The rubber block was baked in an oven at 70° C. for 24 hours and then processed into a substrate with a thickness of 0.15 cm according to the preparing method described in section 3.2.2.

Preparation Example 2-3

The preparation method of Preparation Example 2-2 was repeated to prepare the substrate of Preparation Example 2-3, except that 0.5 wt % (based on the total weight of reactants) of an ultraviolet stabilizer Chiguard 228 (available from Chitec Technology) was further added.

Preparation Example 2-4

The preparation method of Preparation Example 2-2 was repeated to prepare the substrate of Preparation Example 2-4, except that 0.25 wt % (based on the total weight of reactants) of an ultraviolet stabilizer Chiguard 622 (available from Chitec Technology) and 0.25 wt % (based on the total weight of reactants) of an ultraviolet stabilizer Chiguard 100 (available from Chitec Technology) were further added.

3.4. Polymer Structure

Example 1

The thermoplastic aromatic polyurethanes of Preparation Examples 1-5 to 1-7 were used to prepare high-efficiency light shielding layers. The high-efficiency light shielding layers respectively comprise 5 wt %, 10 wt %, and 20 wt % of the reactive ultraviolet absorber and have a thickness of merely 20 μm. Under elevated temperatures, the thermoplastic aromatic polyurethanes of Preparation Examples 1-5 to 1-7 were dissolved respectively using dimethylacetamide (DMAC) to form glue solutions with a solid content of 20%. Subsequently, the glue solutions were further diluted using methyl ethyl ketone (MEK)/toluene to form coating solutions with a solid content of about 10%. The coating solutions were then coated to a transparent glass and dried in an oven at 120° C. to form light shielding layers with a thickness of 20 μm. The light shielding layers were removed from the transparent glass. The light shielding layers of Preparation Examples 1-5 and 1-6 were sampled for weatherability tests, and the results are as follows: (1) after being irradiated by a xenon lamp for 714 hours, the YI value of the 20 μm light shielding layer according to Preparation Example 1-5 is 2.1; after being irradiated by a xenon lamp for 639 hours, the YI value of the 20 μm light shielding layer according to Preparation Example 1-6 is 1.4; and (2) after being exposed to outdoor sunlight for 78 days, the YI value of the 20 μm light shielding layer according to Preparation Example 1-5 is 2.5; after being exposed to outdoor sunlight for 96 days, the YI value of the 20 μm light shielding layer according to Preparation Example 1-6 is 1.3. Based on the above results, it can be seen that the high-efficiency light shielding layer, comprising a high concentration of the reactive ultraviolet absorber, exhibits excellent long-term light and yellowing resistance, in addition to having low chromaticity itself.

The removed light shielding layers were respectively placed on the substrate of Preparation Example 2-1 to form polymer structures. The polymer structures were subjected to weatherability tests according to the aforementioned methods, and the results are tabulated in Table 2-1 and Table 2-2.

TABLE 2-1

Outdoor sunlight weatherability test of polymer structure

| Polymer structure | | | ΔYI after | ΔE after |
|---|---|---|---|---|
| Substrate | Light shielding layer | 0 hour YI | 257 days of outdoor sunlight | 257 days of outdoor sunlight |
| Preparation Example 2-1 | Preparation Example 1-5 | 5.9 | 7.2 | 4.2 |
| Preparation Example 2-1 | Preparation Example 1-6 | 5.5 | 4.7 | 2.9 |
| Preparation Example 2-1 | Preparation Example 1-7 | 5.5 | 3.9 | 2.4 |
| Preparation Example 2-1 | None | 5.9 | 32.1 | 19.8 |

TABLE 2-2

Xenon lamp weatherability test of polymer structure

| Polymer structure | | | ΔYI after being irradiated | ΔE after being irradiated |
|---|---|---|---|---|
| Substrate | Light shielding layer | 0 hour YI | by a xenon lamp for 4 weeks | by a xenon lamp for 4 weeks |
| Preparation Example 2-1 | Preparation Example 1-7 | 5.1 | 2.3 | 1.3 |

As can be seen from Table 2-1 and Table 2-2, the polymer structure of the present invention has excellent weatherability and can be used in an outdoor location for an extended period. Additionally, as shown in Table 2-1, when compared to the substrate of thermoplastic aromatic polyurethane without a light shielding layer (i.e., Preparation Example 2-1), the polymer structures of the present invention (i.e., the polymer structures comprising the substrate of Preparation Example 2-1 and the light shielding layers of Preparation Examples 1-5 to 1-7) demonstrate 10 significantly improved weatherability and yellowing resistance.

Example 2

According to the methods of Example 1, the thermoplastic aromatic polyurethanes of Preparation Examples 1-5 and 1-6 were dissolved respectively using DMAC to form glue solutions with a solid content of 20%. Afterward, the glue solutions were further diluted using MEK/toluene to form coating solutions with a solid content of about 10%. The coating solutions were coated to a transparent glass and dried in an oven at 120° C. to form light shielding layers with a thickness of 20 μm. The light shielding layers were removed from the transparent glass. The removed light shielding layers were respectively placed on the substrates of Preparation Examples 2-2 to 2-4 to form polymer structures. The polymer structures were subjected to weatherability tests according to the aforementioned methods, and the results are tabulated in Table 2-3 to Table 2-6.

TABLE 2-3

Xenon lamp weatherability test of polymer structure

| Polymer structure | | | ΔYI after being irradiated | ΔE after being irradiated |
|---|---|---|---|---|
| Substrate | Light shielding layer | 0 hour YI | by a xenon lamp for 714 hours | by a xenon lamp for 714 hours |
| Preparation Example 2-2 | Preparation Example 1-5 | 3.2 | 6.3 | 3.7 |
| Preparation Example 2-3 | Preparation Example 1-5 | 3.3 | 4.9 | 2.7 |
| Preparation Example 2-4 | Preparation Example 1-5 | 3.9 | 6.7 | 3.8 |

TABLE 2-4

Xenon lamp weatherability test of polymer structure

| Polymer structure | | | ΔYI after being irradiated | ΔE after being irradiated |
|---|---|---|---|---|
| Substrate | Light shielding layer | 0 hour YI | by a xenon lamp for 639 hours | by a xenon lamp for 639 hours |
| Preparation Example 2-2 | Preparation Example 1-6 | 3.1 | 2.8 | 1.6 |
| Preparation Example 2-3 | Preparation Example 1-6 | 3.4 | 2.0 | 1.1 |
| Preparation Example 2-4 | Preparation Example 1-6 | 4.1 | 3.0 | 1.6 |

TABLE 2-5

Outdoor sunlight weatherability test of polymer structure

| Polymer structure | | | ΔYI after | ΔE after |
|---|---|---|---|---|
| Substrate | Light shielding layer | 0 hour YI | 78 days of outdoor sunlight | 78 days of outdoor sunlight |
| Preparation Example 2-2 | Preparation Example 1-5 | 3.2 | 1.1 | 0.8 |
| Preparation Example 2-3 | Preparation Example 1-5 | 3.3 | 0.2 | 0.4 |
| Preparation Example 2-4 | Preparation Example 1-5 | 3.9 | 1.4 | 0.7 |

TABLE 2-6

Outdoor sunlight weatherability test of polymer structure

| Polymer structure | | | ΔY after | ΔE after |
|---|---|---|---|---|
| Substrate | Light shielding layer | 0 hour YI | 78 days of outdoor sunlight | 78 days of outdoor sunlight |
| Preparation Example 2-2 | Preparation Example 1-6 | 3.1 | 1.0 | 0.8 |
| Preparation Example 2-3 | Preparation Example 1-6 | 3.4 | −0.3 | 0.5 |
| Preparation Example 2-4 | Preparation Example 1-6 | 4.1 | 0.9 | 0.6 |

As can be seen from Table 2-3 to Table 2-6, in the polymer structure of the present invention, the yellowing value of the 20 μm light shielding layer itself is extremely low. If an ultraviolet stabilizer is additionally incorporated into the substrate, the entire polymer structure can exhibit further improved light and yellowing resistance, making it capable of having excellent long-term outdoor weatherability and yellowing resistance.

3.5. Co-Extruded Polymer Structure

Example 3

The three-layer co-extruded polymer structures, including the reactive ultraviolet absorber-containing thermoplastic aromatic polyurethanes of Preparation Examples 1-5 and 1-6, a thermoplastic aromatic polyurethane (model: 90 ΔE, available from Huntsman) added with HALS (model: Chiguard 1152, available from Chitec Technology; content: 0.5 wt %), and polypropylene (model: PD943, available from LCY CHEMICAL), were formed through co-extrusion. The light shielding layer formed from the thermoplastic aromatic polyurethanes of Preparation Examples 1-5 and 1-6 has a thickness of about 30 μm. The substrate formed from the thermoplastic aromatic polyurethane 90 ΔE has a thickness of about 120 μm, and the carrier formed from polypropylene PD 943 has a thickness of about 125 μm. The co-extruded polymer structures were subjected to weatherability tests according to the aforementioned methods, and the results are tabulated in Table 3-1 and Table 3-2.

TABLE 3-1

| Xenon lamp weatherability test of co-extruded polymer structure | | | |
|---|---|---|---|
| | 0 hour YI | ΔYI after being irradiated by a xenon lamp for 2092 hours | ΔE after being irradiated by a xenon lamp for 2092 hours |
| Co-extruded polymer structure comprising the light shielding layer of Preparation Example 1-5 | 1.0 | 4.4 | 2.5 |
| Co-extruded polymer structure comprising the light shielding layer of Preparation Example 1-6 | 1.1 | 2.3 | 1.4 |

TABLE 3-2

| Outdoor sunlight weatherability test of co-extruded polymer structure | | | |
|---|---|---|---|
| | 0 hour YI | ΔYI after 86 days of outdoor sunlight | ΔE after 86 days of outdoor sunlight |
| Co-extruded polymer structure comprising the light shielding layer of Preparation Example 1-5 | 1.0 | 3.2 | 1.9 |
| Co-extruded polymer structure comprising the light shielding layer of Preparation Example 1-6 | 1.1 | 2.5 | 1.5 |

As can be seen from Table 3-1 and Table 3-2, the polymer structure of the present invention, manufactured using a different method, also exhibits good weatherability and is suitable for long-term outdoor use. Through the design of the present invention, thermoplastic aromatic polyurethane, which is prone to yellowing under light irradiation, can achieve excellent long-term weatherability and yellowing resistance. This eliminates restrictions on the applications of aromatic polyurethanes in outdoor products due to weatherability and yellowing issues, 10 broadening the range of industrial applications and creating potential commercial value.

The above examples are used to illustrate the principle and efficacy of the present invention and show the inventive features thereof, but are not meant to limit the scope of the present invention. Any modifications and replacements that can be easily accomplished by persons skilled in this field without departing from the principle of the present invention shall fall within the scope of protection of the present invention.

What is claimed is:

1. A polymer structure, which comprises a substrate and a light shielding layer, wherein the substrate has a surface at least partially covered by the light shielding layer, wherein the substrate comprises a first polymer, the light shielding layer has a thickness of 5 μm to 200 μm and comprises a second polymer, wherein the first polymer is a thermoplastic aromatic polyurethane and the second polymer is a thermoplastic aromatic polyurethane, wherein the second polymer comprises: a structural unit derived from a first ultraviolet absorber; triethylene glycol bis(3-tert-butyl-4-hydroxy-5-methylphenyl) propionate; benzoic acid, 3,5-bis(1,1-dimethylethyl)-4-hydroxy-, 4-(1,1-dimethylethyl)-2-[5-(1,1-dimethylethyl)-2,3-dihydro-2-oxo-3-benzofuranyl]phenyl ester; 3,9-bis(2,4-bis(1,1-dimethylethyl) phenoxy)-2,4,8,10-tetraoxa-3,9-diphosphaspiro(5.5) undecane; and 2,4-bis [N-butyl-N-(1-cyclohexyloxy-2,2,6,6-tetramethylpiperidin-4-yl)amino]-6-(2-hydroxyethylamine)-1,3,5-triazine, and wherein the first ultraviolet absorber is represented by the following chemical formula (I):

[Chemical formula (I)]

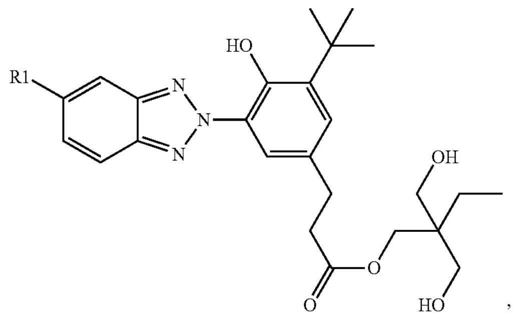

, in chemical formula (I), R1 is H or Cl, wherein based on the total weight of the second polymer, the content of the first ultraviolet absorber ranges from 10 wt % to 20 wt %, and wherein the polymer structure has a visible light transmittance of 65% or more.

2. The polymer structure of claim 1, wherein the light shielding layer at least covers a light-receiving surface of the substrate.

3. The polymer structure of claim 2, wherein the substrate and the light shielding layer independently comprise an additive selected from the group consisting of a defoaming agent, a leveling wetting agent, a thickener, a dispersing agent, micronized wax, a matting powder, an antibacterial agent, a metal oxide-based light screening agent, a light stabilizer, a thermal stabilizer, a non-reactive ultraviolet absorber, a monofunctional reactive ultraviolet absorber, an antioxidant, a filler, a flame retardant, a plasticizer, a dye, a pigment, a brightener, an antistatic agent, a fluorescent whitening agent, an antideteriorant, a metal stabilizer, an acid absorbent, an anti-hydrolysis agent, wax, and combinations thereof.

4. The polymer structure of claim 1, wherein the substrate and the light shielding layer independently comprise an additive selected from the group consisting of a defoaming agent, a leveling wetting agent, a thickener, a dispersing agent, micronized wax, a matting powder, an antibacterial agent, a metal oxide-based light screening agent, a light stabilizer, a thermal stabilizer, a non-reactive ultraviolet absorber, a monofunctional reactive ultraviolet absorber, an antioxidant, a filler, a flame retardant, a plasticizer, a dye, a pigment, a brightener, an antistatic agent, a fluorescent whitening agent, an antideteriorant, a metal stabilizer, an acid absorbent, an anti-hydrolysis agent, wax, and combinations thereof.

5. A method for preparation of an ultraviolet-resistant article, which comprises utilizing the polymer structure of claim 1.

6. The method of claim 5, wherein the article is selected from the group consisting of a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, and an explosion-proof panel.

7. The method of claim 5, wherein the article is selected from the group consisting of a wrap film for vehicles, a lamp cup, a housing for mobile devices, a housing for vehicles, a car lamp, a vehicle interior trim material, a windscreen, a side-window glass, a window, a door, a color filter, clothes, pants, a coat, shoes, an optical lens, an optical element, a photochromic lens, a contact lens, a roof film, a roof tile, a roof lining, eaves, a wall material, a floor material, a road construction member, a conduit material, a signboard, a sun visor, a greenhouse covering film, a backlight, a windmill component, a transparent aircraft component, a radome, an explosion-proof glass, a bullet-proof panel, a transparent screen film, a conductive film, a microwave absorbing film, a thermal transfer film, a packaging film, and a low-resistance film.

8. A method for preparation of an ultraviolet-resistant article, which comprises utilizing the polymer structure of claim 2.

9. The method of claim 8, wherein the article is selected from the group consisting of a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, and an explosion-proof panel.

10. The method of claim 8, wherein the article is selected from the group consisting of a wrap film for vehicles, a lamp cup, a housing for mobile devices, a housing for vehicles, a car lamp, a vehicle interior trim material, a windscreen, a side-window glass, a window, a door, a color filter, clothes, pants, a coat, shoes, an optical lens, an optical element, a photochromic lens, a contact lens, a roof film, a roof tile, a roof lining, eaves, a wall material, a floor material, a road construction member, a conduit material, a signboard, a sun visor, a greenhouse covering film, a backlight, a windmill component, a transparent aircraft component, a radome, an explosion-proof glass, a bullet-proof panel, a transparent screen film, a conductive film, a microwave absorbing film, a thermal transfer film, a packaging film, and a low-resistance film.

11. A method for preparation of an ultraviolet-resistant article, which comprises utilizing the polymer structure of claim 4.

12. The method of claim 11, wherein the article is selected from the group consisting of a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, and an explosion-proof panel.

13. The method of claim 11, wherein the article is selected from the group consisting of a wrap film for vehicles, a lamp cup, a housing for mobile devices, a housing for vehicles, a car lamp, a vehicle interior trim material, a windscreen, a side-window glass, a window, a door, a color filter, clothes, pants, a coat, shoes, an optical lens, an optical element, a photochromic lens, a contact lens, a roof film, a roof tile, a roof lining, eaves, a wall material, a floor material, a road construction member, a conduit material, a signboard, a sun visor, a greenhouse covering film, a backlight, a windmill component, a transparent aircraft component, a radome, an explosion-proof glass, a bullet-proof panel, a transparent screen film, a conductive film, a microwave absorbing film, a thermal transfer film, a packaging film, and a low-resistance film.

14. A method for preparation of an ultraviolet-resistant article, which comprises utilizing the polymer structure of claim 3.

15. The method of claim 14, wherein the article is selected from the group consisting of a transparent housing, an electronic product member, an outer material for solar panels, a transportation vehicle member, a clothing material, an optical article, an architectural member, a wind power member, an agricultural member, a military-industrial article, an external viewing surface of display, a film, a thin sheet, and an explosion-proof panel.

16. The method of claim 14, wherein the article is selected from the group consisting of a wrap film for vehicles, a lamp cup, a housing for mobile devices, a housing for vehicles, a car lamp, a vehicle interior trim material, a windscreen, a side-window glass, a window, a door, a color filter, clothes, pants, a coat, shoes, an optical lens, an optical element, a photochromic lens, a contact lens, a roof film, a roof tile, a roof lining, eaves, a wall material, a floor material, a road construction member, a conduit material, a signboard, a sun visor, a greenhouse covering film, a backlight, a windmill component, a transparent aircraft component, a radome, an explosion-proof glass, a bullet-proof panel, a transparent screen film, a conductive film, a microwave absorbing film, a thermal transfer film, a packaging film, and a low-resistance film.

* * * * *